UNITED STATES PATENT OFFICE 2,324,186

TREATMENT OF RUBBER

Robert T. Armstrong, Radburn, and Edwin J. Hart, Nutley, N. J., assignors to United States Rubber Company, New York, N. Y., a corporation of New Jersey No Drawing. Application January 16, 1941, Serial No. 374,702

12 Claims. (Cl. 260—810)

This invention relates to a new class of deterioration retarders.

An object of the invention is to provide a new class of antioxidants or age-resisters for rubber and other unsaturated organic substances which tend to deteriorate by absorption of oxygen from the air, including allied gums, unsaturated fatty oils such as unsaturated vegetable oils, essential oils, petroleum oils and their derivatives, such as gasolines, soaps, aldehydes, synthetic resins, paints and the like. A further object is to provide chemicals which additionally act as flex-improvers or anti-flex-cracking agents for vulcanized rubber such as tire treads which undergo repeated strains during use. Other objects will be apparent from the following description.

According to the invention the organic substance has incorporated therein a compound having the general formula

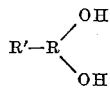

where R and R' are distinct but directly connected aromatic hydrocarbon groups. The preferred compounds, because of their activity, are the dihydroxy biphenyls having both hydroxyl groups linked to the same benzene nucleus.

Illustrating such compounds are the following:

2,5-dihydroxy biphenyl

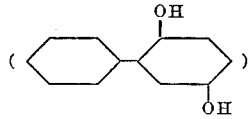

3,4-dihydroxy biphenyl

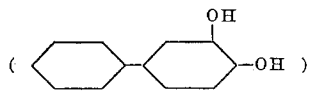

2,3-dihydroxy biphenyl

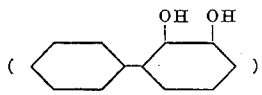

2,4-dihydroxy biphenyl

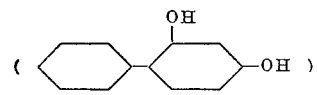

2,6-dihydroxy biphenyl

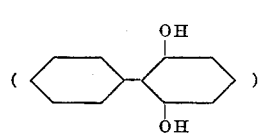

3,5-dihydroxy biphenyl

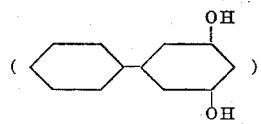

The chemicals have special properties in connection with the preservation of rubber and vulcanized rubber goods; certain of them do not discolor the surface of rubber containing them on exposure to the light and atmosphere.

The data in the following table illustrate the flexing properties conveyed to typical tread stocks by some of the compounds constituting this invention. (The chemical was added to the tread compound on a laboratory mill at approximately 180° F.; the parts are by weight.)

|  | A (control) | B | C |
|---|---|---|---|
| Smoked sheet | 100 | 100 | 100 |
| Carbon black | 50 | 50 | 50 |
| Zinc oxide | 2 | 2 | 2 |
| Softener | 7 | 7 | 7 |
| Accelerator | 1 | 1 | 1 |
| Sulfur | 2.5 | 2.5 | 2.5 |
| 2,5-dihydroxy-biphenyl |  | 1.0 |  |
| 3,4-dihydroxy-biphenyl |  |  | 1.0 |
| Cured 35' at 146.5° C. in a mold: |  |  |  |
| Tensile strength____lbs./sq. in. | 4,000 | 4,300 | 4,300 |
| Tensile strength after 120 hrs. in oxygen bomb____lbs./sq. in. | 423 | 550 | 740 |
| Flexing [1] to failure____kc | 66 | 156 | 146 |

[1] Standard DeMattia flexing test: 300 cycles/min. through a "hair pin" bend to 100% elongation, at room temperature.

In contrast to the above, it was found that, where the hydroxy groups are on different nuclei as in 4,4'-dihydroxybiphenyl, the stock containing 1.0 part thereof does not improve the flexing over that shown by the control stock A.

The data in the following table illustrate the age resisting properties conveyed to a typical white stock by the compounds of this invention. (The chemical was added to the mix on a laboratory mill at approximately 150° F.; the parts are by weight.)

| | | | |
|---|---|---|---|
| Pale crepe | 100 | 100 | 100 |
| Zinc oxide | 33 | 33 | 33 |
| White pigment | 41 | 41 | 41 |
| Stearic acid | 0.5 | 0.5 | 0.5 |
| Accelerator | 0.69 | 0.69 | 0.69 |
| Sulfur | 3.5 | 3.5 | 3.5 |
| 3,4-dihydroxy biphenyl |  | 1.0 |  |
| 2,5-dihydroxy biphenyl |  |  | 1.0 |
| Cured 35' at 146.5° steam pressure: |  |  |  |
| Tensile strength____lbs./sq. in. | 3,100 | 2,900 | 2,800 |
| Tensile strength after 240 hrs. in oxygen bomb____lbs./sq. in. | Failed | 921 | 608 |

It is to be understood that the invention may be applied to the preservation of natural rubber compositions as well as artificially-prepared rubber compositions including reclaimed rubbers, and latices of such rubber compositions.

It is understood that other desired filling and compounding ingredients may be incorporated along with the preservative, for example, in the case of rubber, there may be incorporated other accelerators, antioxidants, softeners, etc.

The anti-oxidant may be incorporated in any type of rubber composition, such as those used for automobile tires and tubes, hose, belting, sheet and thread rubber, rubberized fabrics, molded boots, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the anti-oxidant may be dissolved there in a suitable small proportion. The anti-oxidant may be incorporated into solid substances by milling or mastication and prepared for incorporation into dispersions or solutions, either in powder, paste, or solution form, or applied in such forms for incorporation by diffusion, to the surfaces of vulcanized or unvulcanized rubber goods.

Having thus described our invention, what we claim and desire to protect by Letters Patent is:

1. A method of retarding the deterioration of rubber due to flexing which comprises incorporating in a vulcanizable rubber composition a dihydroxy substituted biphenyl wherein both hydroxyl groups are attached to the same phenyl nucleus.

2. A method of retarding the deterioration of rubber due to flexing which comprises incorporating in a vulcanizable rubber composition a member of the class consisting of compounds having the formula

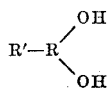

where R and R' are aromatic hydrocarbon groups of the benzene series.

3. A method of retarding the deterioration of rubber due to flexing which comprises incorporating in a vulcanizable rubber composition a compound having the formula

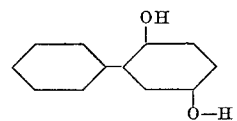

4. A method of retarding the deterioration of rubber due to flexing which comprises incorporating in a vulcanizable rubber composition a compound having the formula

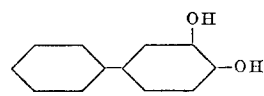

5. A vulcanizable rubber composition containing an anti-flex-cracking agent which is a dihydroxy substituted biphenyl wherein both hydroxyl groups are attached to the same phenyl nucleus.

6. A vulcanization product of rubber containing an anti-flex-cracking agent which is a dihydroxy substituted biphenyl wherein both hydroxyl groups are attached to the same phenyl nucleus.

7. A vulcanizable rubber composition containing an anti-flex-cracking agent which is 3,4-dihydroxy biphenyl.

8. A vulcanization product of a rubber composition containing an anti-flex-cracking agent which is 3,4-dihydroxy biphenyl.

9. A method of improving the anti-flex-cracking quality of vulcanizable rubber compositions which comprises incorporating therein 3,4-dihydroxy biphenyl.

10. A vulcanizable rubber composition containing an anti-flex-cracking agent which is 2,5-dihydroxy biphenyl.

11. A vulcanization product of a rubber composition containing an anti-flex-cracking agent which is 2,5-dihydroxy biphenyl.

12. A method of improving the anti-flex-cracking quality of vulcanizable rubber compositions which comprises incorporating therein 2,5-dihydroxy biphenyl.

ROBERT T. ARMSTRONG.
EDWIN J. HART.